United States Patent
Heck et al.

(10) Patent No.: US 12,548,973 B2
(45) Date of Patent: Feb. 10, 2026

(54) HYBRID LASER WITH AMORPHOUS BONDING LAYER

(71) Applicant: Intel Corporation, Santa Clara, CA (US)

(72) Inventors: John Heck, Berkeley, CA (US); Paul B. Fischer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 847 days.

(21) Appl. No.: 17/467,747

(22) Filed: Sep. 7, 2021

(65) Prior Publication Data

US 2023/0075255 A1    Mar. 9, 2023

(51) Int. Cl.
*G02B 6/12* (2006.01)
*H01S 5/02* (2006.01)
*H01S 5/026* (2006.01)

(52) U.S. Cl.
CPC .............. *H01S 5/026* (2013.01); *H01S 5/021* (2013.01); *H01S 5/0215* (2013.01); *G02B 6/12004* (2013.01)

(58) Field of Classification Search
CPC ........ H01S 5/026; H01S 5/021; H01S 5/0215; G02B 6/12004; G02B 6/12
See application file for complete search history.

(56) References Cited

U.S. PATENT DOCUMENTS

| | | | |
|---|---|---|---|
| 8,472,494 B2 * | 6/2013 | Akiyama | H01S 5/02325 372/50.1 |
| 8,620,164 B2 | 12/2013 | Heck et al. | |
| 9,513,436 B2 * | 12/2016 | Czornomaz | H01S 5/026 |
| 10,910,792 B2 * | 2/2021 | Shin | H01S 5/2031 |

* cited by examiner

*Primary Examiner* — Jennifer Doan
(74) *Attorney, Agent, or Firm* — Akona IP PC

(57) ABSTRACT

Described herein are IC devices that include hybrid lasers formed with a bonding layer. Hybrid lasers include an active light-emitting region coupled to a waveguide. In a hybrid laser, the waveguide and the light-emitting regions are formed separately from different materials, e.g., the waveguide is a single-crystal silicon, and the light-emitting region includes III-V semiconductors. An amorphous group IV material, such as silicon or germanium, is advantageously used to bond the light-emitting region to the waveguide.

20 Claims, 9 Drawing Sheets

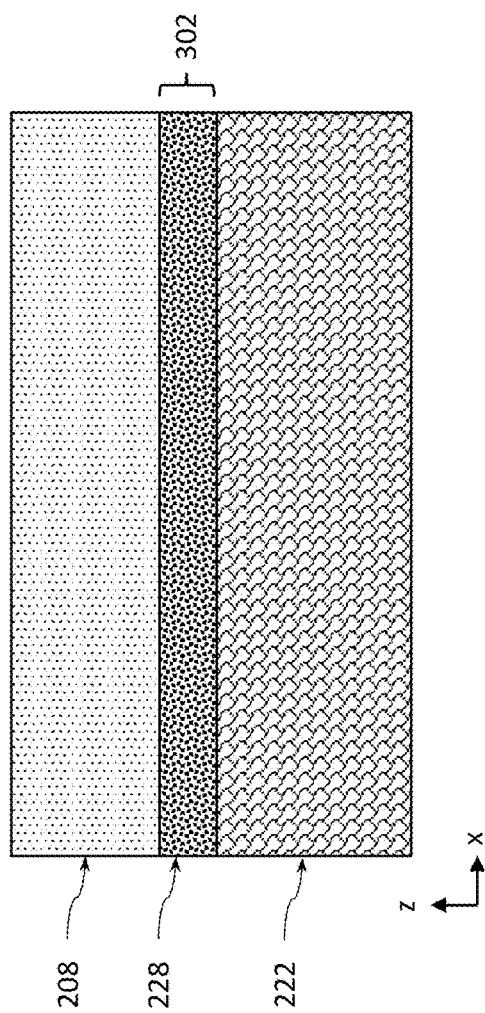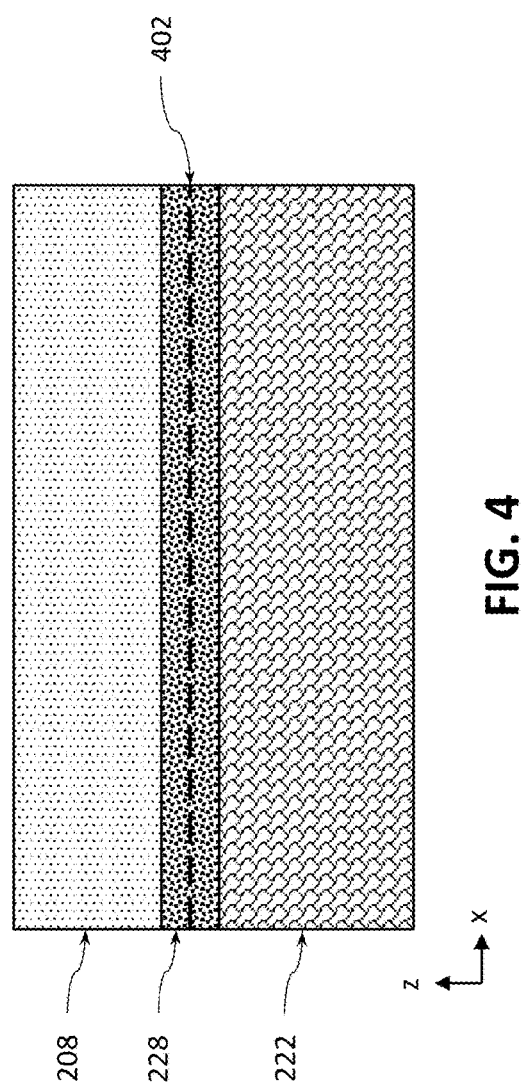

HYBRID LASER WITH AMORPHOUS BONDING LAYER

TECHNICAL FIELD

This disclosure relates generally to the field of hybrid lasers, and more specifically, to hybrid III-V lasers formed by bonding a III-V active layer to a waveguide layer.

BACKGROUND

Hybrid semiconductor lasers are generally made from light-emitting III-V semiconductor materials. The term "III-V" herein refers to elements from group III to group V of the periodic table. Typical hybrid semiconductor lasers are composed of two components: a III-V active region to generate light and a silicon waveguide to carry the generated light. The two components are typically coupled together using a molecular $O_2$ plasma-assisted wafer bonding procedure.

The molecular $O_2$ plasma-assisted wafer bonding procedure is a hydrophilic bonding process that applies a thin oxide layer between the two components. The hydrophilic bonding process requires completely clean, smooth, and contamination-free bonding surfaces, which are difficult to reliably obtain in high volume manufacturing. In the hydrophilic bonding process, the two components are combined to form a hybrid III-V silicon laser by annealing the two components at high temperature e.g., 300° C., for 40-60 minutes to form an intermediate-strength bond between the layer of the III-V active region and the silicon substrate. The process of annealing also requires channels to be made in the silicon component to diffuse hydrogen formed by the process of annealing. Any surface roughness or contamination between the bonding surfaces results in large unbounded areas causing the intermediate-strength bond.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 3 provides a detail view of a portion of the waveguide layer, a portion of the light-emitting layer, and the bonding layer, according to some embodiments of the present disclosure.

FIG. 4 provides a second detail view of a portion of the waveguide layer, a portion of the light-emitting layer, and the bonding layer in which a seam is visible in the bonding layer, according to some embodiments of the present disclosure.

DETAILED DESCRIPTION

Overview

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

For purposes of illustrating hybrid lasers formed with bonding layers as described herein it might be useful to first understand previous hybrid laser structures and functionality. The following foundational information may be viewed as a basis from which the present disclosure may be properly explained. Such information is offered for purposes of explanation only and, accordingly, should not be construed in any way to limit the broad scope of the present disclosure and its potential applications.

Figure 1:
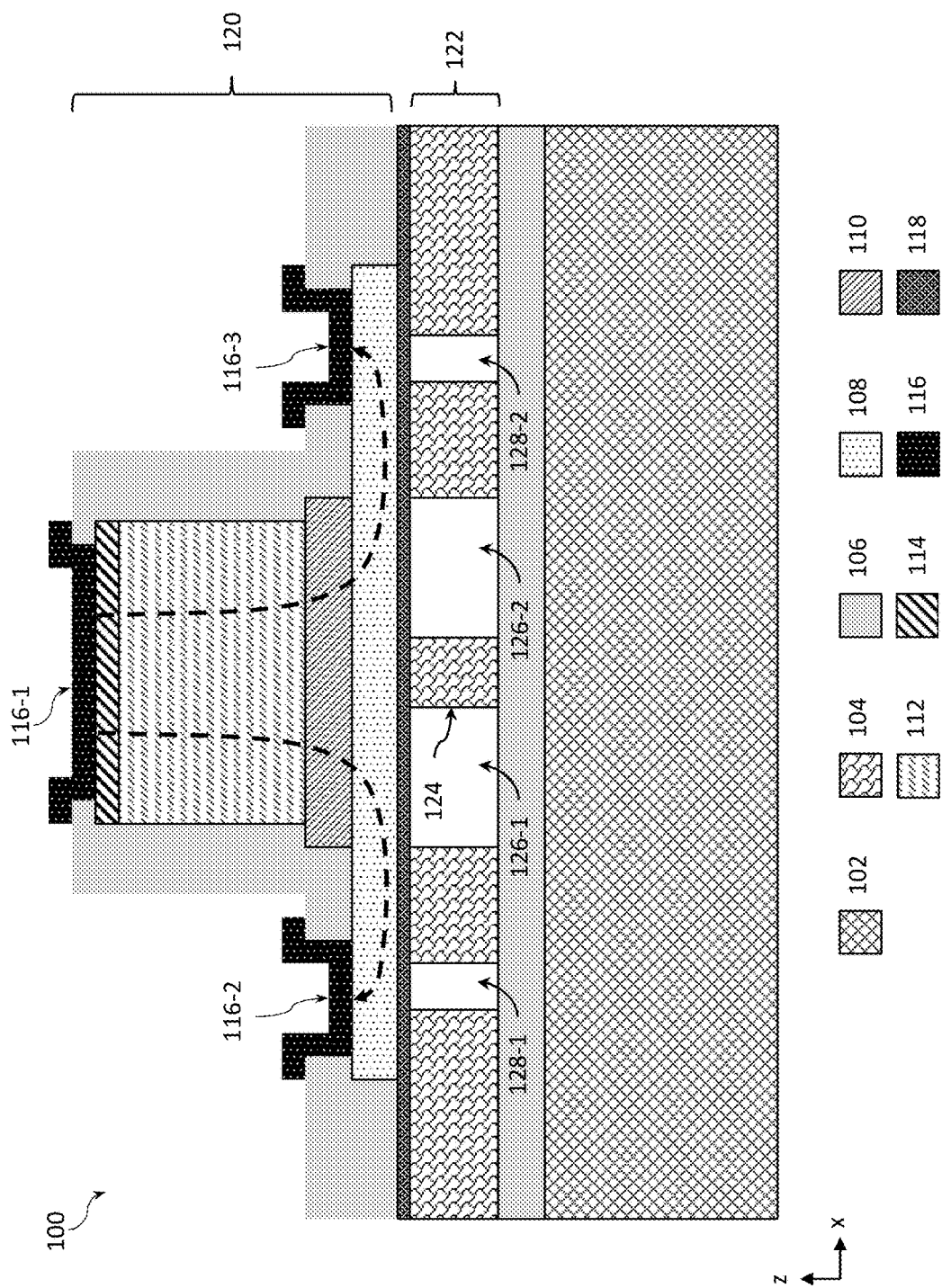
FIG. 1 illustrates a cross-section of a prior art hybrid III-V silicon laser in which the III-V active region is bonded to silicon region via a layer of oxide.

FIG. 1 illustrates a cross-section of a prior art hybrid III-V silicon laser 100 in which a light-emitting layer 120 is bonded to a waveguide layer 122 at high temperature via a layer of oxide 118.

Different regions of the hybrid laser 100 are indicated by different patterns, with a legend showing the correspondence between the reference numerals and patterns being provided at the bottom of the drawing page. The same set of patterns is used throughout FIGS. 1-5 to refer to different materials or regions. The legend illustrates that the different patterns show a support structure 102, a waveguide material 104, an insulator 106, N-type indium phosphide (N-InP) 108, a multiple quantum well (MQW) material 110, P-type InP (P-InP) 112, P-InGaAs 114, contacts 116, and a bonding oxide 118.

The light-emitting layer 120 includes an active region formed from layers of III-V semiconductor materials. In this example, the active region includes N-InP 108, MQW material 110, P-InP 112, and P-InGaAs 114. The active region generates a current that flows from a positive contact 116-1 towards the negative contacts 116-2 and 116-3 when a potential difference is applied across the positive contact 116-1 and the negative contacts 116-2 and 116-3. The current generated in the active region, and particular, in the MQW material 110, generates light which is channeled through a waveguide 124. Light traveling in the waveguide 124 is confined within the waveguide 124 by regions 126-1 and 126-2 on either side of the waveguide 124. The light generated by the current forms a laser beam which can be used for optical communication.

The light-emitting layer 120 is bonded to the waveguide layer 122 using a plasma activation process. The plasma activation process uses a thin layer of bonding oxide 118 between the N-InP layer 108 of the active region and waveguide layer 122. The waveguide layer 122 may be a silicon-on-insulator (SOI) having an insulating layer 106, e.g., a buried oxide layer, between the support structure 102 (e.g., a silicon substrate) and a single-crystal silicon waveguide layer 122. The plasma activation process forms hydrogen bonds between water molecules. To complete the hydrogen bonds, an annealing process generates hydrogen molecules which diffuse either to the edge of the bonded surface or to vertical channels 128-1 and 128-2 connected to the buried oxide layer which absorbs the hydrogen molecules.

The annealing process causes stress to the light-emitting layer 120 and the waveguide layer 122. Furthermore, the vertical trenches 128 for channeling the hydrogen molecules require an additional process mask. The plasma activation process adds to the overall cost of fabricating high volume hybrid III-V silicon lasers.

Embodiments of the present disclosure may improve on at least some of the challenges and issues of the plasma activation process by using an alternate bonding process that uses a thin group IV bonding layer to bond the waveguide layer and the light-emitting layer. The bonding material may be, for example, amorphous silicon or amorphous germanium, both group IV materials. The waveguide layer may include single-crystal silicon, single-crystal germanium, or another single-crystal material suitable for carrying optical signals. A thin layer of the bonding material is applied to a face of the waveguide layer, and a thin layer of the bonding material is applied to a face of the light-emitting layer. The bonding material is applied to both surfaces in a high-vacuum environment, and, without removing the layers from the high-vacuum environment, the two faces with the bonding material are put in contact with each other, forming a bonding interface.

The bonding interface is transparent to light and allows light generated in the light-emitting layer to cross into the waveguide layer. The bonding layer does not result in the release of molecules that require the addition of vertical channels in the waveguide layer, e.g., the trenches 128 in FIG. 1. Furthermore, a silicon or germanium bonding material can bond the waveguide layer and the light-emitting layer nearly instantaneously at room temperature, without requiring an annealing process. The bonding layer described herein provides a strong bond between the light-emitting layer and the waveguide layer, that is achieved through a simpler, less expensive, and faster process.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well-known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For convenience, if a collection of drawings designated with different letters are present, e.g., FIGS. 7A-7B, such a collection may be referred to herein without the letters, e.g., as "FIG. 7."

In the drawings, some schematic illustrations of example structures of various devices and assemblies described herein may be shown with precise right angles and straight lines, this is simply for ease of illustration, and embodiments of these assemblies may be curved, rounded, or otherwise irregularly shaped as dictated by, and sometimes inevitable due to, the manufacturing processes used to fabricate semiconductor device assemblies. Therefore, it is to be understood that such schematic illustrations may not reflect real-life process limitations which may cause the features to not look so "ideal" when any of the structures described herein are examined using e.g., scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication. Furthermore, although a certain number of a given element may be illustrated in some of the drawings, this is simply for ease of illustration, and more, or less, than that number may be included in hybrid lasers and related devices according to various embodiments of the present disclosure. Still further, various views shown in some of the drawings are intended to show relative arrangements of various elements therein. In other embodiments, various IC assemblies, or portions thereof, may include other elements or components that are not illustrated. Inspection of layout and mask data and reverse engineering of parts of a device to reconstruct the circuit using e.g., optical microscopy, TEM, or SEM, and/or inspection of a cross-section of a device to detect the shape and the location of various device elements described herein using e.g., physical failure analysis (PFA) would allow determination of presence of one or more hybrid lasers having amorphous group IV bonding layers as described herein.

Various operations may be described as multiple discrete actions or operations in turn, in a manner that is most helpful in understanding the claimed subject matter. However, the order of description should not be construed as to imply that these operations are necessarily order dependent. These operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. Although certain elements may be referred to in the singular herein, such elements may include multiple sub-elements. For example, "an electrically conductive material" may include one or more electrically conductive materials.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

For example, the term "interconnect" may be used to describe any element formed of an electrically conductive material for providing electrical connectivity to one or more components associated with an IC or/and between various such components. In general, the "interconnect" may refer to both conductive traces (also sometimes referred to as "lines" or "trench contacts") and conductive vias. In general, in context of interconnects, the term "conductive trace" may be used to describe an electrically conductive element isolated by an insulator material (e.g., a low-k dielectric material) that is provided within the plane of an IC die. Such traces are typically stacked into several levels, or several layers, of metallization stacks. On the other hand, the term "via" may be used to describe an electrically conductive element that interconnects two or more traces of different levels. To that end, a via may be provided substantially perpendicularly to the plane of an IC die and may interconnect two traces in adjacent levels or two traces in not adjacent levels. A term "metallization stack" may be used to refer to a stack of one or more interconnects for providing connectivity to different circuit components of an IC chip. Sometimes, traces and vias may be referred to as "conductive traces" and "conductive vias", respectively, to highlight the fact that these elements include electrically conductive materials such as metals.

Interconnects as described herein may be used for providing connectivity to one or more components associated with an IC or/and between various such components, where, in various embodiments, components associated with an IC may include, for example, transistors, diodes, power sources, resistors, capacitors, inductors, sensors, transceivers, receivers, antennas, etc. Components associated with an IC may include those that are mounted on IC or those connected to an IC. The IC may be either analog or digital and may be used in a number of applications, such as microprocessors, optoelectronics, logic blocks, audio amplifiers, etc., depending on the components associated with the IC. The IC may be employed as part of a chipset for executing one or more related functions in a computer.

In context of photonics, waveguides described herein may be considered a type of "interconnect" in that they support propagation of optical signals between various components associated with an IC and/or between various such components. Such interconnects may be referred to as "optical interconnects" to differentiate them from electrically conductive interconnects of electronic components, which may be referred to herein simply as "interconnects." Similarly, vias made of dielectric materials to serve as waveguides that support propagation of optical signals are described herein as "dielectric vias" to differentiate them from electrically conductive vias of electronic components, which may be described herein simply as "vias."

In another example, the terms "package" and "IC package" are synonymous, as are the terms "die" and "IC die," the term "insulating" means "electrically insulating," the term "conducting" means "electrically conducting," unless otherwise specified. Furthermore, the term "connected" may be used to describe a direct electrical or magnetic connection between the things that are connected, without any intermediary devices, while the term "coupled" may be used to describe either a direct electrical or magnetic connection between the things that are connected, or an indirect connection through one or more passive or active intermediary devices. The term "circuit" may be used to describe one or more passive and/or active components that are arranged to cooperate with one another to provide a desired function.

In yet another example, if used, the terms "oxide," "carbide," "nitride," etc. refer to compounds containing, respectively, oxygen, carbon, nitrogen, etc., the term "high-k dielectric" refers to a material having a higher dielectric constant than silicon oxide, while the term "low-k dielectric" refers to a material having a lower dielectric constant than silicon oxide.

The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

Example Hybrid Laser with an Amorphous Bonding Layer

Figure 2:
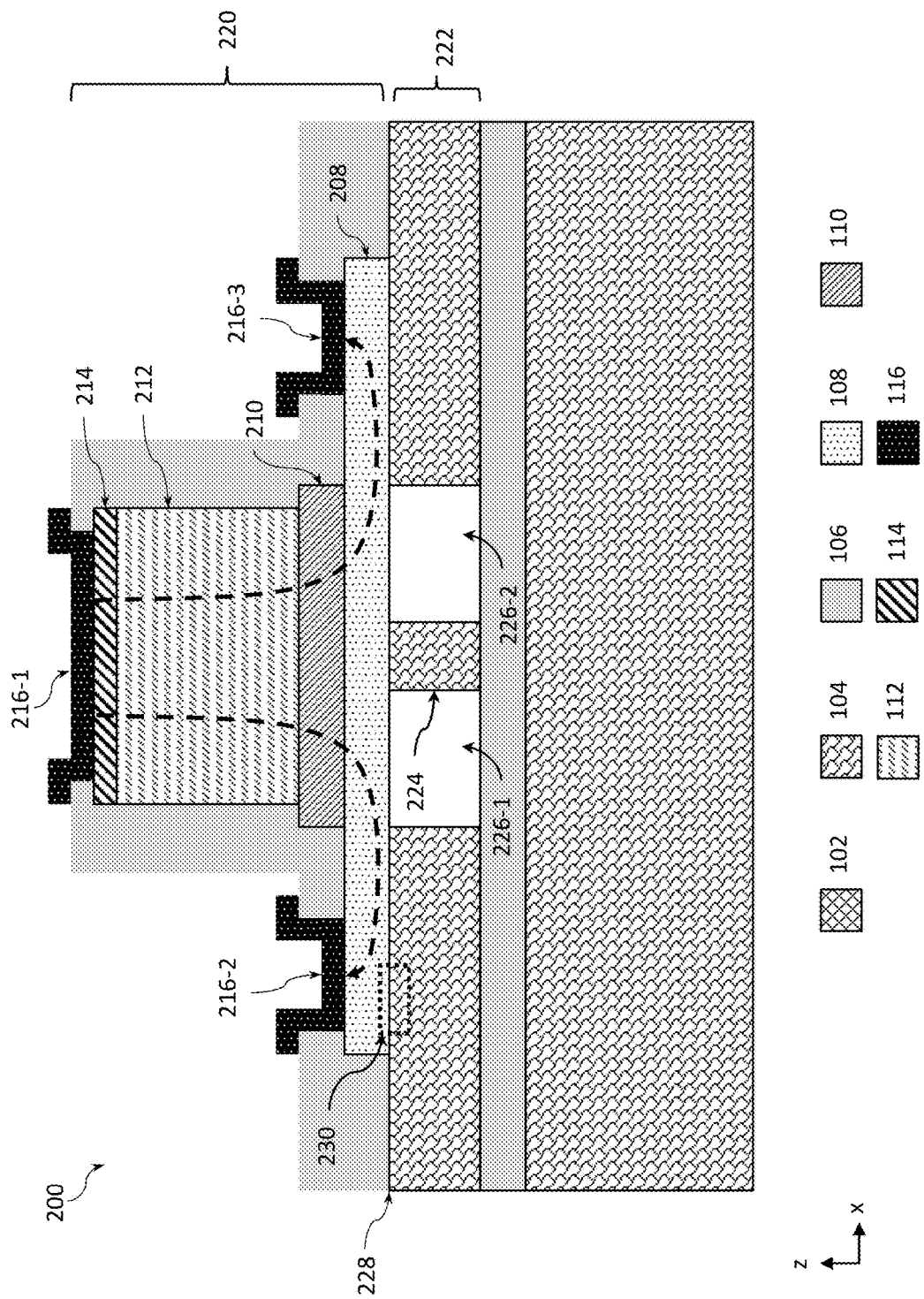
FIG. 2 illustrates a cross-section of a hybrid laser in which a light-emitting layer is bonded to a waveguide layer by an amorphous bonding layer, according to some embodiments of the present disclosure.

FIG. 2 illustrates a cross-section of a hybrid laser in which a light-emitting layer is bonded to a waveguide layer by an amorphous bonding layer, according to some embodiments of the present disclosure. A thin, amorphous bonding layer 228 bonds the light-emitting layer 220 to the waveguide layer 222. Examples of the bonding layer 228 are depicted in greater detail in FIGS. 3 and 4. FIGS. 3 and 4 correspond to the region 230, indicated with a dashed box.

The light-emitting layer 220 includes multiple layers of semiconductor material from group III, group IV, and/or group V. The light-emitting layer 220 includes an active region that, in the example shown in FIG. 2, includes N-InP 108, an MQW material 110, P-InP 112, and P-InGaAs 114. The active region generates a current that flows from a first contact (e.g., a positive contact) 216-1 towards second and third contacts (e.g., two negative contacts) 216-2 and 216-3 when a potential difference is applied across the first contact 216-1 and the second and third contacts 216-2 and 216-3. The current generated in the active region, and particular, in the MQW material 110, generates light which is channeled through a waveguide 224. The electrical contacts 216-1, 216-2, and 216-3 may be metal contacts, and are generally not considered part of the active region but are coupled to the active region to provide electric current to the active region.

More generally, the first contact 216-1 is coupled to first semiconductor layer 214, which may be an ohmic contact layer. In the embodiment shown, the first semiconductor layer 214 is composed of p-InGaAs 114. In other embodiments, the first semiconductor layer 214 may be formed of different semiconductor materials, e.g., different p-doping type materials. The first semiconductor layer 214 is coupled to a second semiconductor layer 212, which may be a cladding layer. In the embodiment shown, the second semiconductor layer 212 is composed of P-InP. In other examples, the second semiconductor layer 212 may be formed of different semiconductor materials, e.g., different p-doping type materials.

The second semiconductor layer 212 is coupled to a MQW layer 210. The MQW layer 210 is formed of a MQW material 110, such as AlGaInAs (Aluminum Gallium Indium Arsenide) or another p-doping type material. In some embodiments, the active region further includes to a separated confinement hetero-structure (SCH) layer, not specifically shown in FIG. 2. The SCH layer may be included in the MQW layer 210, or coupled between the MQW layer 210 and the second semiconductor layer 212. The SCH layer may include a p-doping type material, such as AlGaInAs.

The MQW layer 210 is coupled to a third semiconductor layer 208, which may be composed of n-doping type material, such as n-InP 108. The layers 214, 212, 210, and 208 of the active region may have slight differences in their atomic ratios to tune the exact bandgap. In this embodiment, the third semiconductor layer 208 extends laterally on either side of the active region to connect with the second and third contacts 216-2 and 216-3 as shown in FIG. 2.

The back face of the light-emitting layer 220, and in particular, the back face of the third semiconductor layer 208, is coupled to the front face of the waveguide layer 222, including the front face of the waveguide 224 formed in the single crystal material 104 of the waveguide layer 222. A bonding layer 228 bonds the back face of the light-emitting layer 220 to the front face of the waveguide layer 222.

In one embodiment, the bonding surfaces of the light-emitting layer 220 and the waveguide layer 222 are cleaned prior to bonding of the two layers 220 and 222. The cleaning process may remove any oxide and/or organic contaminants from the bonding surfaces of the light-emitting layer 220 and the waveguide layer 222. In one embodiment, the cleaning process comprises an application of an argon ion beam to the bonding surfaces of the light-emitting layer 220 and the waveguide layer 222. In other embodiments, a cleaning process comprising other chemicals may be used to remove any oxide and/or organic contaminants from the bonding surfaces of the light-emitting layer 220 and the waveguide layer 222. If the cleaning is performed in the same environment as the bonding, the cleaning process does not diminish the vacuum environment used for the bonding process, described below.

In the embodiments discussed herein, the process of bonding the bonding surfaces of the light-emitting layer 220 and the waveguide layer 222 using an amorphous bonding material eliminates the need of having vertical trenches to channel hydrogen molecules formed from the process of annealing a bonding oxide, as described with respect to FIG. 1. The absence of the vertical trenches (128 of FIG. 1) further eliminates a process fabrication step in forming the hybrid laser 200 thus saving time and money. The absence of the vertical trenches also improves reliability of the hybrid laser 200 because extra voids between the bonded layers 220 and 222 are removed.

The process of bonding the light-emitting layer 220 and the waveguide layer 222 occurs in a vacuum to avoid contamination of the bonding surfaces. In particular, the bonding material may be applied to one or both of the bonding surfaces in the vacuum, and, without removing the light-emitting layer 220 and the waveguide layer 222 from the vacuum environment, the bonding surfaces are coupled together, and the bonding material causes the light-emitting layer 220 and the waveguide layer 222 to be bonded together.

The bonding may be performed at room temperature, e.g., in a temperature range between 65 Fahrenheit (F) to 85 F. Bonding the light-emitting layer 220 and the waveguide layer 222 at room temperature results in no thermal expansion of the bonding surfaces, which may improve reliability of the hybrid laser 200.

In one embodiment, an optical waveguide 224 is located directly under the bonding layer 228. The waveguide 224, and more generally, the waveguide layer 222, are formed of a substantially monocrystalline material. More specifically, the waveguide 224 has a uniform crystal structure that allows an optical wave to propagate through the waveguide 224 with minimal loss. For example, the waveguide 224 (e.g., the material used to form the waveguide layer 222) may have grain size of at least 5 nanometers. In some embodiments, the waveguide 224 has a larger minimum grain size, e.g., a grain size of at least 50 nanometers, or a grain size of at least 100 nanometers. The waveguide layer 222 may be formed of any suitable single-crystal material, such as single-crystal silicon or single-crystal germanium. In other examples, the waveguide layer 222 may be formed of sapphire, quartz, silicon, a compound of silicon (e.g., silicon oxide), indium phosphide, a germanium alloy, gallium, gallium arsenide, arsenic (e.g., an arsenide III compound, where arsenic III is in combination with another element such as boron, aluminum, gallium, or indium), or any group III-V material (i.e., materials from groups III and V of the periodic system of elements).

In the example shown in FIG. 2, trenches 226-1 and 226-2 are formed on either side of the optical waveguide 224 to confine light within the waveguide 224. The trenches 226 have different optical properties from the waveguide. In some embodiments, the trenches 226 are not filled with another material. In some embodiments, the trenches 226 may be filled with an isolation material with different optical properties from the waveguide 224. For example, the isolation material may include a polycrystalline or amorphous silicon or silicon compound, such as silicon dioxide or silicon nitride, or a single-crystal material with different optical properties than the waveguide, e.g., a monocrystalline material (e.g., single-crystal silicon, gallium arsenide, or any of the other monocrystalline materials mentioned above) with a higher refractive index than the waveguide. In some embodiments, when the bonding material (e.g., amorphous silicon or amorphous germanium) is applied to the front surface of the waveguide layer 222, a portion of the bonding material enters the trenches 226. The bonding material in the trenches 226 may acts as an isolation material or as a passivation material.

The optical waveguide 224 carries the optical signal in the form of a laser which is generated by applying a voltage potential across the first electrical contact 216-1 and the second and third electrical contacts 216-2 and 216-3. In one embodiment, the potential difference across the contacts 216 is such that a current in the range of 30 mA to 150 mA flows from the first contact 216-1 to the second contact 216-2 and the third contact 216-3 via the third semiconductor layer 208, as represented by the dashed arrows in FIG. 2. The current causes the generation of an optical laser in the waveguide 224. In one embodiment, the first contact 216-1 receives a positive voltage potential, while the second and third contacts 216-2 and 216-3 receive a negative voltage potential.

The hybrid laser 200 may be formed or carried out on a support structure 102. The support structure may be, e.g., a substrate, a die, a wafer or a chip. The support structure 102 may, e.g., be the wafer 1500 of FIG. 7A, discussed below, and may be, or be included in, a die, e.g., the singulated die 1502 of FIG. 7B, discussed below. The support structure 102 may be a semiconductor substrate composed of semiconductor material systems including, for example, N-type or P-type materials systems. In one implementation, the semiconductor substrate may be a crystalline substrate formed using a bulk silicon or a silicon-on-insulator (SOI) substructure. In other implementations, the semiconductor substrate may be formed using alternate materials, which may or may not be combined with silicon, that include, but are not limited to, germanium, silicon germanium, indium antimonide, lead telluride, indium arsenide, indium phosphide, gallium arsenide, aluminum gallium arsenide, aluminum arsenide, indium aluminum arsenide, aluminum indium antimonide, indium gallium arsenide, gallium nitride, indium gallium nitride, aluminum indium nitride or gallium antimonide, or other combinations of group III-V materials (i.e., materials from groups III and V of the periodic system of elements), group II-VI (i.e., materials from groups II and IV of the periodic system of elements), or group IV materials (i.e., materials from group IV of the periodic system of elements). In some embodiments, the substrate may be non-crystalline. In some embodiments, the support structure 102 may be a printed circuit board (PCB) substrate. Although a few examples of materials from which the substrate may be formed are described here, any material that may serve as a foundation upon which an optical device implementing any of the hybrid lasers as described herein may be built falls within the spirit and scope of the present disclosure.

FIG. 3 provides a detail view of a portion of the waveguide layer 222, a portion of the light-emitting layer 220, and the bonding layer 228, according to some embodiments of the present disclosure. FIG. 3 corresponds to the region 230 shown in FIG. 2. As depicted in FIG. 3, the bonding layer 228 is coupled between the third semiconductor layer 208 and the waveguide layer 222. The bonding layer 228 has a height 302, which may be between 10 nanometers and 100 nanometers. In some embodiments, the height 302 is between 20 nanometers and 60 nanometers, e.g., 40 nanometers or 50 nanometers.

The bonding layer 228 may be an amorphous group IV material, such as amorphous silicon or amorphous germanium. In contrast to the single-crystal waveguide material described above, an amorphous material does not have a crystal structure. In other examples, the bonding layer 228 may have a polycrystalline structure More generally, the bonding layer 228 has a lower crystallinity than the waveguide layer 222, e.g., the waveguide layer 222 has a crystal structure with a larger grain size (e.g., at least 5 nanometers, or at least 50 nanometers), while the bonding layer 228 has either a smaller grain size (e.g., less than 5 nanometers) or no observed crystal structure.

In some embodiments, multiple materials may be included in the bonding layer 228. For example, amorphous silicon is applied to the bonding surface of the waveguide layer 222, while amorphous germanium is applied to the bonding surface of the light-emitting layer 220 (or vice versa). In this example, the bonding layer 228 includes both silicon and germanium, e.g., one layer of amorphous silicon, and one layer of amorphous germanium, which are bonded together in the bonding layer 228.

FIG. 4 provides a second detail view of a portion of the waveguide layer 222, a portion of the light-emitting layer 220, and the bonding layer 228 in which a seam 402 is visible in the bonding layer 228, according to some embodiments of the present disclosure. As described above, the bonding layer 228 may be formed by applying a portion of the bonding material to the front face of the waveguide layer 222, applying a portion of the bonding material to the back face of the light-emitting layer 220, and putting these bonding surfaces in contact with one another. For example, one layer of the bonding material having at thickness between 5 and 50 nanometers is applied to the front face of the waveguide layer 222, and another layer of the bonding material having at thickness between 5 and 50 nanometers is applied to the front face of the light-emitting layer 220. In some examples, a bonding interface may be formed at the juncture of the two portions of the bonding material when the two surfaces are bonded. The bonding interface may be visible as a seam 402 in the bonding layer 228, e.g., visible in a TEM image of a cross-section of the bonding layer 228. The seam 402 is visible in the x-y plane in the coordinate system shown in FIG. 4, e.g., parallel to the waveguide layer 222 and the light-emitting layer 220. As noted above, the material on either side of the seam 402 may be the same (e.g., amorphous silicon) or different (e.g., amorphous silicon above the seam 402 and amorphous germanium below the seam 402, or vice versa).

Figure 5:
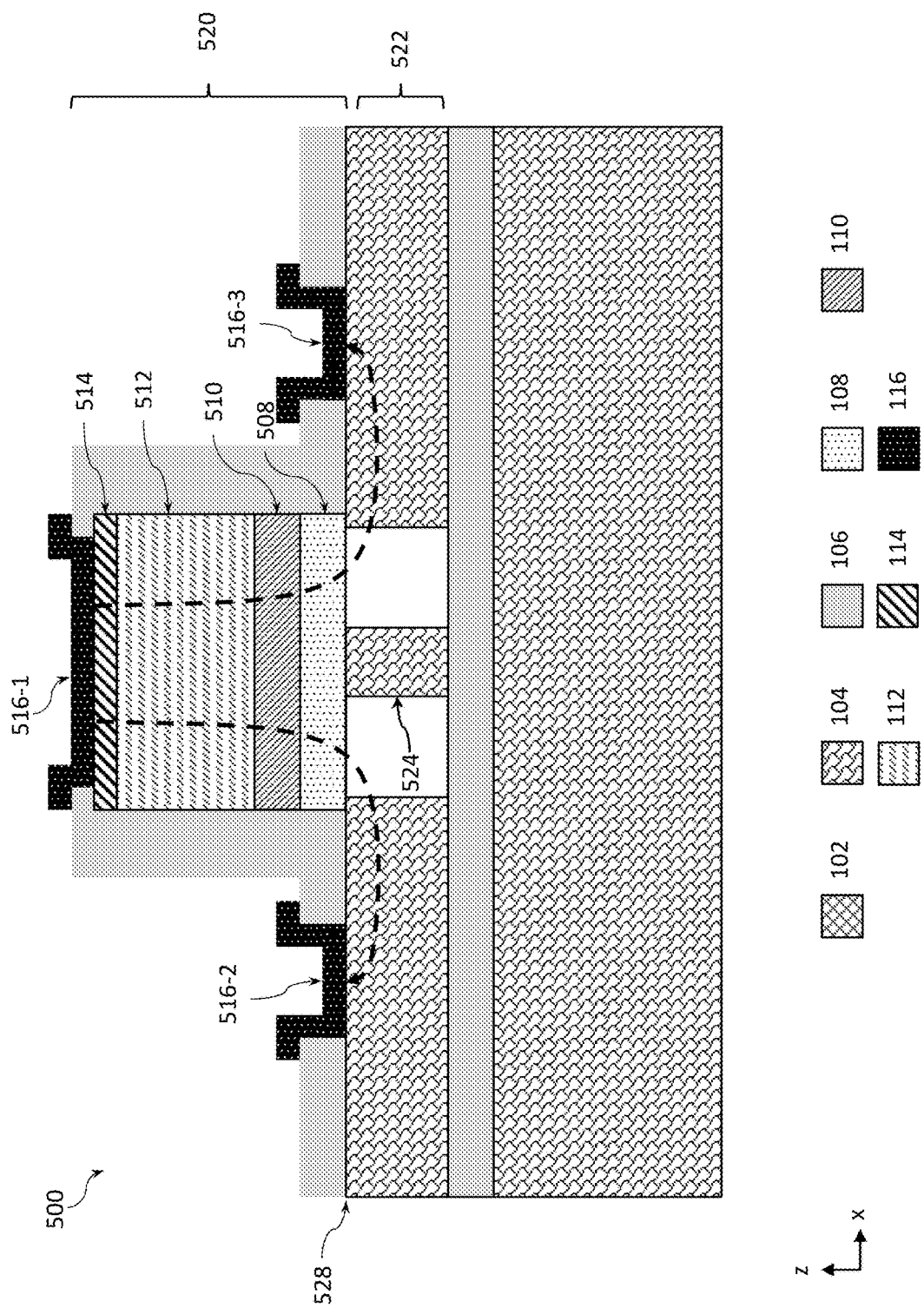
FIG. 5 illustrates a cross-section of a hybrid laser in which a light-emitting layer is bonded to a waveguide layer by an amorphous bonding layer and two electrical contacts are formed directly over the waveguide layer, according to some embodiments of the present disclosure.

FIG. 5 illustrates a cross-section of a hybrid laser 500 in which a light-emitting layer is bonded to a waveguide layer by an amorphous group IV bonding layer and two electrical contacts are formed directly over the waveguide layer, according to some embodiments of the present disclosure. The hybrid laser 500 includes a light-emitting layer 520 and a waveguide layer 522. The waveguide layer 522 includes a waveguide 524 and is similar to the waveguide layer 222 shown in FIG. 2. The light-emitting layer 520 includes an active region with a first semiconductor layer 514, a second semiconductor layer 512, a MQW layer 510, and a third semiconductor layer 508. The first semiconductor layer 514, second semiconductor layer 512, and MQW layer 510 are similar to the corresponding layers 214, 212, and 210 described with respect to FIG. 2. In this example, compared to the structure shown in FIG. 2, the third semiconductor layer 508 does not extend laterally on either side of the active region to connect with the second and third electrical contacts 516-2 and 516-3. Instead, the waveguide layer 222, to which the third semiconductor layer 506 is bonded by the bonding layer 528, provides a path of electric current to the contacts 516-2 and 516-3.

In this embodiment, electric current flows from the first contact 516-1, down through the active region, through the bonding layer 528 and into the waveguide layer 522. The current passes through the waveguide layer 522 and out to the second and third contacts 516-2 and 516-3, as indicated by the dashed arrows. This arrangement is not available in the hybrid laser 100 of FIG. 1 because the oxide bonding interface 118 acts as an insulator inhibiting, transmission of electric current into and through the waveguide layer 122. The embodiment of FIG. 5 further simplifies the fabrication process because the third semiconductor layer 508 does not extend under the second and third contacts 516-2 and 516-3.

Example Process for Forming a Hybrid Laser with an Amorphous Bonding Layer

Figure 6:
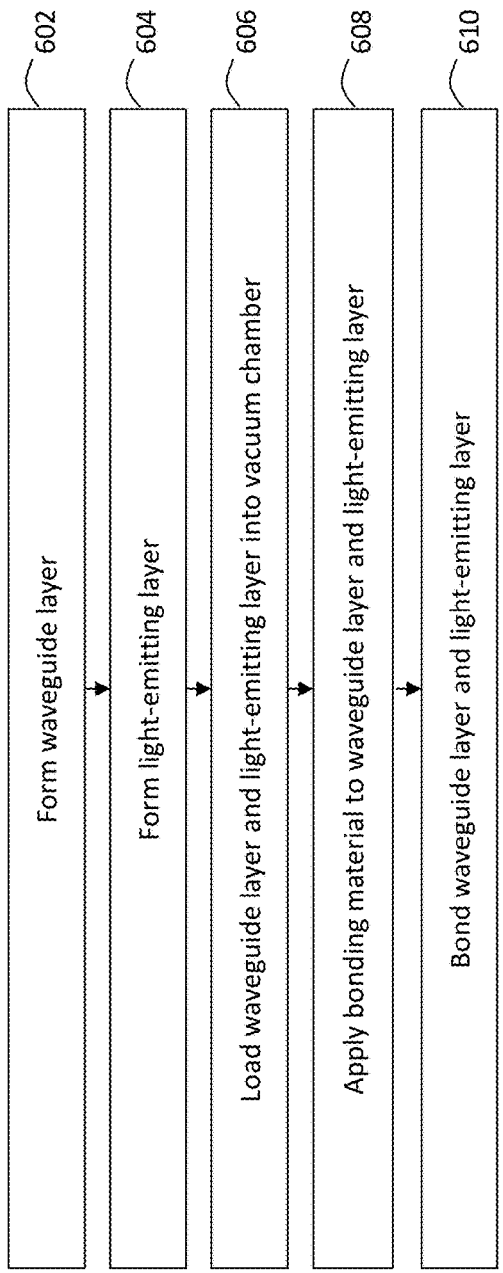
FIG. 6 is a flowchart showing a process for forming a hybrid laser with an amorphous bonding layer, according to some embodiments of the present disclosure.

FIG. 6 is a flowchart showing a process for forming a hybrid laser with an amorphous group IV bonding layer, according to some embodiments of the present disclosure. The method begins with forming 602 a waveguide layer, e.g., the waveguide layer 222 shown in FIG. 2, or the waveguide layer 522 shown in FIG. 5. Forming the waveguide layer may include forming one or more waveguides, e.g., waveguide 224 or waveguide 524, in a single-crystal material, e.g., by forming trenches or other isolation regions around the waveguide to confine light within the waveguide.

The method proceeds with forming 604 a light-emitting layer, e.g., the light-emitting layer 220 shown in FIG. 2, or the light-emitting layer 520 shown in FIG. 5. The light-emitting layer includes several layers of semiconductor materials, including a MQW region that emits light in response to a current. Forming 602 the waveguide layer and forming 604 the light-emitting layer may be performed in the opposite order or in parallel.

The method proceeds with loading the waveguide layer and the light-emitting layer into a vacuum chamber. In some embodiments, at least some of the steps of forming 602 the waveguide layer and/or forming 604 the light-emitting layer may also be performed in the vacuum chamber.

The method proceeds with applying 608 a bonding material, e.g., an amorphous group IV material such as silicon or germanium, to the waveguide layer and the light-emitting layer. The bonding material is deposited to the bonding surfaces of the waveguide layer and the light-emitting layer, e.g., the front face of the waveguide layer 222 and the back face of the light-emitting layer 220 in the orientation of FIG. 2.

The method proceeds with bonding 610 the waveguide layer and the light-emitting layer. The bonding surfaces of the waveguide layer and the light-emitting layer, with the bonding material applied, are put in contact with each other, and the bonding material bonds the two surfaces together. The applying 608 and bonding 610 are both performed in the vacuum chamber.

Variations and Implementations

Various device assemblies illustrated in FIGS. 2-5 do not represent an exhaustive set of hybrid lasers formed with bonding layers as described herein, but merely provide examples of such devices/structures/assemblies. In particular, the number and positions of various elements shown in FIGS. 2-5 is purely illustrative and, in various other embodiments, other numbers of these elements, provided in other locations relative to one another may be used in accordance with the general architecture considerations described herein.

Further, FIGS. 2-5 are intended to show relative arrangements of the elements therein, and the device assemblies of these figures may include other elements that are not specifically illustrated (e.g., various interfacial layers). Similarly, although particular arrangements of materials are discussed with reference to FIGS. 2-5, intermediate materials may be included in the IC devices and assemblies of these figures. Still further, although some elements of the various cross-sectional views are illustrated in FIGS. 2-5 as being planar rectangles or formed of rectangular solids, this is simply for ease of illustration, and embodiments of these assemblies may be curved, rounded, or otherwise irregularly shaped as dictated by, and sometimes inevitable due to, the manufacturing processes used to fabricate semiconductor device assemblies.

Inspection of layout and mask data and reverse engineering of parts of a device to reconstruct the circuit using e.g., optical microscopy, TEM, or SEM, and/or inspection of a cross-section of a device to detect the shape and the location of various device elements described herein using e.g., Physical Failure Analysis (PFA) would allow determination of presence of the hybrid lasers formed with bonding layers as described herein.

Example Devices

The hybrid lasers formed with bonding layers disclosed herein may be included in any suitable electronic device. FIGS. 7-10 illustrate various examples of apparatuses that may include one or more of the three-dimensional transistors with recessed gates disclosed herein.

Figure 7B:
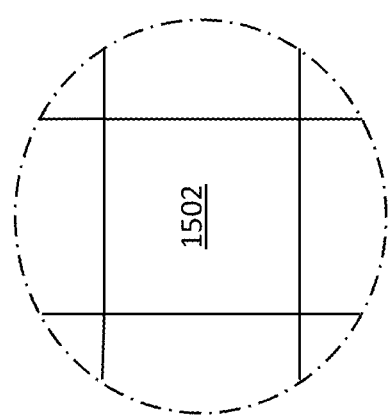
FIGS. 7A and 7B are top views of, respectively, a wafer and dies that may include one or more hybrid lasers formed with bonding layers in accordance with any of the embodiments disclosed herein.
Figure 7A:
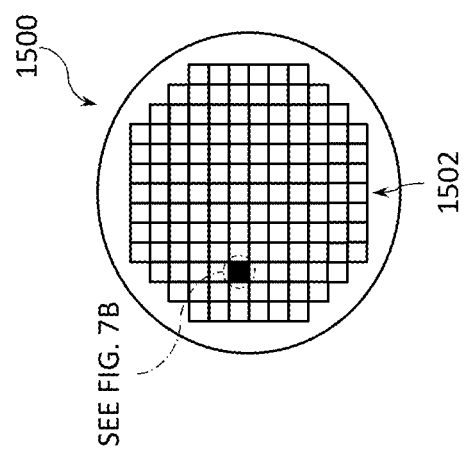

FIGS. 7A and 7B are top views of a wafer and dies that include one or more IC structures with one or more hybrid lasers formed with bonding layers in accordance with any of the embodiments disclosed herein. The wafer 1500 may be composed of semiconductor material and may include one or more dies 1502 having IC structures formed on a surface of the wafer 1500. Each of the dies 1502 may be a repeating unit of a semiconductor product that includes any suitable IC structure (e.g., the IC structures as shown in any of FIGS. 2-5, or any further embodiments of the IC structures described herein). After the fabrication of the semiconductor product is complete (e.g., after manufacture of one or more IC structures with one or more hybrid lasers formed with bonding layers as described herein, included in a particular electronic component, e.g., in a transistor or in a memory device), the wafer 1500 may undergo a singulation process in which each of the dies 1502 is separated from one another to provide discrete "chips" of the semiconductor product. In particular, devices that include one or more IC structures with one or more hybrid lasers formed with bonding layers as disclosed herein may take the form of the wafer 1500 (e.g., not singulated) or the form of the die 1502 (e.g., singulated). The die 1502 may include one or more transistors (e.g., one or more of the transistors 1640 of FIG. 8, discussed below) and/or supporting circuitry to route electrical signals to the transistors, as well as any other IC components (e.g., one or more IC structures with one or more hybrid lasers formed with bonding layers). In some embodiments, the wafer 1500 or the die 1502 may include a memory device (e.g., an SRAM device), a logic device (e.g., an AND, OR, NAND, or NOR gate), or any other suitable circuit element. Multiple ones of these devices may be combined on a single die 1502. For example, a memory array formed by multiple memory devices may be formed on a same die 1502 as a processing device (e.g., the processing device 1802 of FIG. 10) or other logic that is configured to store information in the memory devices or execute instructions stored in the memory array.

Figure 8:
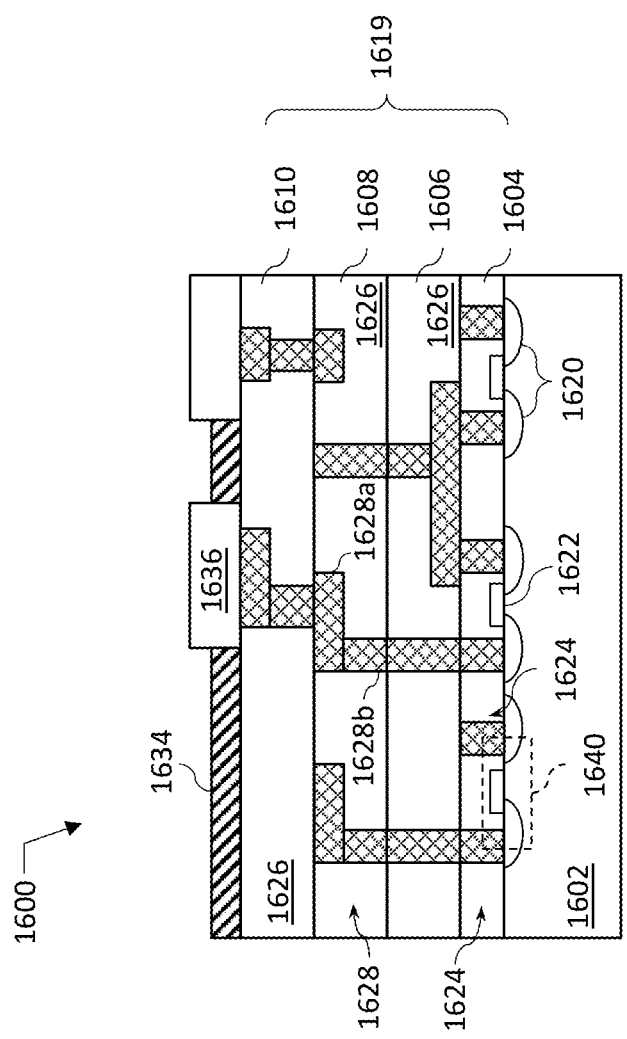
FIG. 8 is a cross-sectional side view of a IC package that may include hybrid lasers formed with bonding layers in accordance with any of the embodiments disclosed herein.

FIG. 8 is a cross-sectional side view of an IC device 1600 that may include one or more IC structures with one or more hybrid lasers formed with bonding layers in accordance with any of the embodiments disclosed herein. The IC device 1600 may be formed on a substrate 1602 (e.g., the wafer 1500 of FIG. 7A) and may be included in a die (e.g., the die 1502 of FIG. 7B). The substrate 1602 may be any substrate as described herein. The substrate 1602 may be part of a singulated die (e.g., the dies 1502 of FIG. 7B) or a wafer (e.g., the wafer 1500 of FIG. 7A).

The IC device 1600 may include one or more device layers 1604 disposed on the substrate 1602. The device layer 1604 may include features of one or more transistors 1640 (e.g., metal oxide semiconductor field-effect transistors (MOSFETs)) formed on the substrate 1602. The device layer 1604 may include, for example, one or more source and/or drain (S/D) regions 1620, a gate 1622 to control current flow in the transistors 1640 between the S/D regions 1620, and one or more S/D contacts 1624 to route electrical signals to/from the S/D regions 1620. The transistors 1640 may include additional features not depicted for the sake of clarity, such as device isolation regions, gate contacts, and the like. The transistors 1640 are not limited to the type and configuration depicted in FIG. 8 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon and nanowire transistors.

Each transistor 1640 may include a gate 1622 formed of at least two layers, a gate electrode layer and a gate dielectric layer.

The gate electrode layer may be formed on the gate interconnect support layer and may consist of at least one P-type workfunction metal or N-type workfunction metal, depending on whether the transistor is to be a PMOS or an NMOS transistor, respectively. In some implementations, the gate electrode layer may consist of a stack of two or more metal layers, where one or more metal layers are workfunction metal layers and at least one metal layer is a fill metal layer. Further metal layers may be included for other purposes, such as a barrier layer or/and an adhesion layer.

For a PMOS transistor, metals that may be used for the gate electrode include, but are not limited to, ruthenium, palladium, platinum, cobalt, nickel, and conductive metal oxides, e.g., ruthenium oxide. A P-type metal layer will enable the formation of a PMOS gate electrode with a workfunction that is between about 4.9 electron Volts (eV) and about 5.2 eV. For an NMOS transistor, metals that may be used for the gate electrode include, but are not limited to, hafnium, zirconium, titanium, tantalum, aluminum, alloys of these metals, and carbides of these metals such as hafnium carbide, zirconium carbide, titanium carbide, tantalum carbide, aluminum carbide, tungsten, tungsten carbide. An N-type metal layer will enable the formation of an NMOS gate electrode with a workfunction that is between about 3.9 eV and about 4.2 eV.

In some embodiments, when viewed as a cross section of the transistor 1640 along the source-channel-drain direction, the gate electrode may be formed as a U-shaped structure that includes a bottom portion substantially parallel to the surface of the substrate and two sidewall portions that are substantially perpendicular to the top surface of the substrate. In other embodiments, at least one of the metal layers that form the gate electrode may simply be a planar layer that is substantially parallel to the top surface of the substrate and does not include sidewall portions substantially perpendicular to the top surface of the substrate. In other embodiments, the gate electrode may be implemented as a combination of U-shaped structures and planar, non-U-shaped structures. For example, the gate electrode may be implemented as one or more U-shaped metal layers formed atop one or more planar, non-U-shaped layers. In some embodiments, the gate electrode may consist of a V-shaped structure (e.g., when a fin of a FinFET transistor does not have a "flat" upper surface, but instead has a rounded peak).

Generally, the gate dielectric layer of a transistor 1640 may include one layer or a stack of layers, and the one or more layers may include silicon oxide, silicon dioxide, and/or a high-k dielectric material. The high-k dielectric material included in the gate dielectric layer of the transistor 1640 may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric layer include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric layer to improve its quality when a high-k material is used.

Although not specifically shown in FIG. 8, the IC device 1600 may include one or more hybrid lasers formed with bonding layers at any suitable location in the IC device 1600.

The S/D regions 1620 may be formed within the substrate 1602 adjacent to the gate 1622 of each transistor 1640, using any suitable processes known in the art. For example, the S/D regions 1620 may be formed using either an implantation/diffusion process or a deposition process. In the former process, dopants such as boron, aluminum, antimony, phosphorous, or arsenic may be ion-implanted into the substrate 1602 to form the S/D regions 1620. An annealing process that activates the dopants and causes them to diffuse farther into the substrate 1602 may follow the ion implantation process. In the latter process, an epitaxial deposition process may provide material that is used to fabricate the S/D regions 1620. In some implementations, the S/D regions 1620 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1620 may be formed using one or more alternate semiconductor materials such as germanium or a group III-V material or alloy. In further embodiments, one or more layers of metal and/or metal alloys may be used to form the S/D regions 1620. In some embodiments, an etch process may be performed before the epitaxial deposition to create recesses in the substrate 1602 in which the material for the S/D regions 1620 is deposited.

Electrical signals, such as power and/or input/output (I/O) signals, may be routed to and/or from the transistors 1640 of the device layer 1604 through one or more interconnect layers disposed on the device layer 1604 (illustrated in FIG. 8 as interconnect layers 1606-1610). For example, electrically conductive features of the device layer 1604 (e.g., the gate 1622 and the S/D contacts 1624) may be electrically coupled with the interconnect structures 1628 of the interconnect layers 1606-1610. The one or more interconnect layers 1606-1610 may form an ILD stack 1619 of the IC device 1600.

The interconnect structures 1628 may be arranged within the interconnect layers 1606-1610 to route electrical signals according to a wide variety of designs (in particular, the arrangement is not limited to the particular configuration of interconnect structures 1628 depicted in FIG. 8). Although a particular number of interconnect layers 1606-1610 is depicted in FIG. 8, embodiments of the present disclosure include IC devices having more or fewer interconnect layers than depicted.

In some embodiments, the interconnect structures 1628 may include trench contact structures 1628a (sometimes referred to as "lines") and/or via structures 1628b (sometimes referred to as "holes") filled with an electrically conductive material such as a metal. The trench contact structures 1628a may be arranged to route electrical signals in a direction of a plane that is substantially parallel with a surface of the substrate 1602 upon which the device layer 1604 is formed. For example, the trench contact structures 1628*a* may route electrical signals in a direction in and out of the page from the perspective of FIG. 8. The via structures 1628*b* may be arranged to route electrical signals in a direction of a plane that is substantially perpendicular to the surface of the substrate 1602 upon which the device layer 1604 is formed. In some embodiments, the via structures 1628*b* may electrically couple trench contact structures 1628*a* of different interconnect layers 1606-1610 together.

The interconnect layers 1606-1610 may include a dielectric material 1626 disposed between the interconnect structures 1628, as shown in FIG. 8. The dielectric material 1626 may take the form of any of the embodiments of the dielectric material provided between the interconnects of the IC structures disclosed herein.

In some embodiments, the dielectric material 1626 disposed between the interconnect structures 1628 in different ones of the interconnect layers 1606-1610 may have different compositions. In other embodiments, the composition of the dielectric material 1626 between different interconnect layers 1606-1610 may be the same.

A first interconnect layer 1606 (referred to as Metal 1 or "M1") may be formed directly on the device layer 1604. In some embodiments, the first interconnect layer 1606 may include trench contact structures 1628*a* and/or via structures 1628*b*, as shown. The trench contact structures 1628*a* of the first interconnect layer 1606 may be coupled with contacts (e.g., the S/D contacts 1624) of the device layer 1604.

A second interconnect layer 1608 (referred to as Metal 2 or "M2") may be formed directly on the first interconnect layer 1606. In some embodiments, the second interconnect layer 1608 may include via structures 1628*b* to couple the trench contact structures 1628*a* of the second interconnect layer 1608 with the trench contact structures 1628*a* of the first interconnect layer 1606. Although the trench contact structures 1628*a* and the via structures 1628*b* are structurally delineated with a line within each interconnect layer (e.g., within the second interconnect layer 1608) for the sake of clarity, the trench contact structures 1628*a* and the via structures 1628*b* may be structurally and/or materially contiguous (e.g., simultaneously filled during a dual-damascene process) in some embodiments.

A third interconnect layer 1610 (referred to as Metal 3 or "M3") (and additional interconnect layers, as desired) may be formed in succession on the second interconnect layer 1608 according to similar techniques and configurations described in connection with the second interconnect layer 1608 or the first interconnect layer 1606.

The IC device 1600 may include a solder resist material 1634 (e.g., polyimide or similar material) and one or more bond pads 1636 formed on the interconnect layers 1606-1610. The bond pads 1636 may be electrically coupled with the interconnect structures 1628 and configured to route the electrical signals of the transistor(s) 1640 to other external devices. For example, solder bonds may be formed on the one or more bond pads 1636 to mechanically and/or electrically couple a chip including the IC device 1600 with another component (e.g., a circuit board). The IC device 1600 may have other alternative configurations to route the electrical signals from the interconnect layers 1606-1610 than depicted in other embodiments. For example, the bond pads 1636 may be replaced by or may further include other analogous features (e.g., posts) that route the electrical signals to external components.

Figure 9:
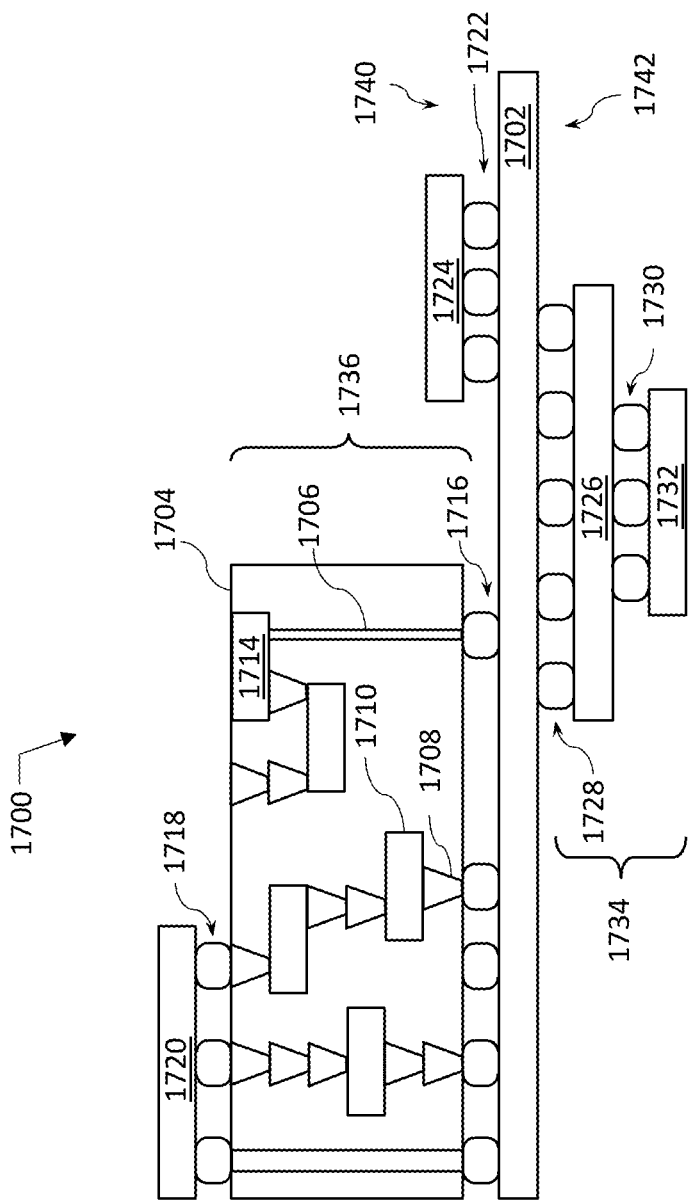
FIG. 9 is a cross-sectional side view of an IC device assembly that may include hybrid lasers formed with bonding layers in accordance with any of the embodiments disclosed herein.

FIG. 9 is a cross-sectional side view of an IC device assembly 1700 that may include components having or being associated with (e.g., being electrically connected by means of) one or more IC structures with hybrid lasers formed with bonding layers in accordance with any of the embodiments disclosed herein. The IC device assembly 1700 includes a number of components disposed on a circuit board 1702 (which may be, e.g., a motherboard). The IC device assembly 1700 includes components disposed on a first face 1740 of the circuit board 1702 and an opposing second face 1742 of the circuit board 1702; generally, components may be disposed on one or both faces 1740 and 1742. In particular, any suitable ones of the components of the IC device assembly 1700 may include any of the hybrid lasers formed with bonding layers, disclosed herein.

In some embodiments, the circuit board 1702 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1702. In other embodiments, the circuit board 1702 may be a non-PCB substrate.

The IC device assembly 1700 illustrated in FIG. 9 includes a package-on-interposer structure 1736 coupled to the first face 1740 of the circuit board 1702 by coupling components 1716. The coupling components 1716 may electrically and mechanically couple the package-on-interposer structure 1736 to the circuit board 1702 and may include solder balls (as shown in FIG. 9), male and female portions of a socket, an adhesive, an underfill material, and/or any other suitable electrical and/or mechanical coupling structure.

The package-on-interposer structure 1736 may include an IC package 1720 coupled to an interposer 1704 by coupling components 1718. The coupling components 1718 may take any suitable form for the application, such as the forms discussed above with reference to the coupling components 1716. Although a single IC package 1720 is shown in FIG. 9, multiple IC packages may be coupled to the interposer 1704; indeed, additional interposers may be coupled to the interposer 1704. The interposer 1704 may provide an intervening substrate used to bridge the circuit board 1702 and the IC package 1720. The IC package 1720 may be or include, for example, a die (the die 1502 of FIG. 7B), an IC device (e.g., the IC device 1600 of FIG. 8), or any other suitable component. In some embodiments, the IC package 1720 may include one or more hybrid lasers formed with bonding layers, as described herein. Generally, the interposer 1704 may spread a connection to a wider pitch or reroute a connection to a different connection. For example, the interposer 1704 may couple the IC package 1720 (e.g., a die) to a ball grid array (BGA) of the coupling components 1716 for coupling to the circuit board 1702. In the embodiment illustrated in FIG. 9, the IC package 1720 and the circuit board 1702 are attached to opposing sides of the interposer 1704; in other embodiments, the IC package 1720 and the circuit board 1702 may be attached to a same side of the interposer 1704. In some embodiments, three or more components may be interconnected by way of the interposer 1704.

The interposer 1704 may be formed of an epoxy resin, a fiberglass-reinforced epoxy resin, a ceramic material, or a polymer material such as polyimide. In some implementations, the interposer 1704 may be formed of alternate rigid or flexible materials that may include the same materials described above for use in a semiconductor substrate, such as silicon, germanium, and other group III-V and group IV materials. The interposer 1704 may include metal interconnects 1708 and vias 1710, including but not limited to TSVs 1706. The interposer 1704 may further include embedded devices 1714, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency (RF) devices, power amplifiers, power management devices, antennas, arrays, sensors, and microelectromechanical systems (MEMS) devices may also be formed on the interposer 1704. The interposer 1704 may further include one or more hybrid lasers formed with bonding layers, as described herein. The package-on-interposer structure 1736 may take the form of any of the package-on-interposer structures known in the art.

The IC device assembly 1700 may include an IC package 1724 coupled to the first face 1740 of the circuit board 1702 by coupling components 1722. The coupling components 1722 may take the form of any of the embodiments discussed above with reference to the coupling components 1716, and the IC package 1724 may take the form of any of the embodiments discussed above with reference to the IC package 1720.

The IC device assembly 1700 illustrated in FIG. 9 includes a package-on-package structure 1734 coupled to the second face 1742 of the circuit board 1702 by coupling components 1728. The package-on-package structure 1734 may include an IC package 1726 and an IC package 1732 coupled together by coupling components 1730 such that the IC package 1726 is disposed between the circuit board 1702 and the IC package 1732. The coupling components 1728 and 1730 may take the form of any of the embodiments of the coupling components 1716 discussed above, and the IC packages 1726 and 1732 may take the form of any of the embodiments of the IC package 1720 discussed above. The package-on-package structure 1734 may be configured in accordance with any of the package-on-package structures known in the art.

Figure 10:
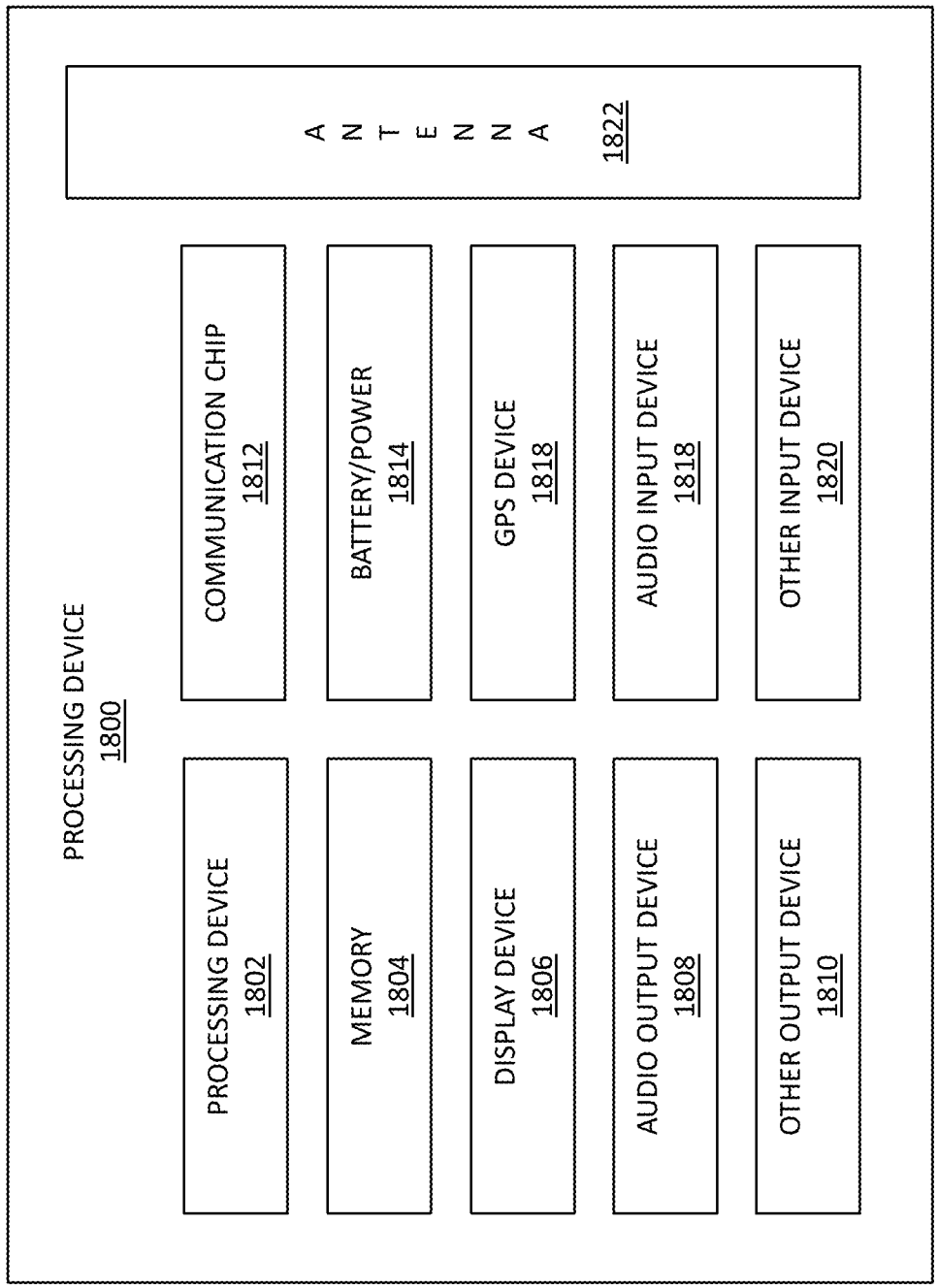
FIG. 10 is a block diagram of an example computing device that may include hybrid lasers formed with bonding layers in accordance with any of the embodiments disclosed herein.

FIG. 10 is a block diagram of an example computing device 1800 that may include one or more components including one or more IC structures with one or more hybrid lasers formed with bonding layers in accordance with any of the embodiments disclosed herein. For example, any suitable ones of the components of the computing device 1800 may include a die (e.g., the die 1502 of FIG. 7B) having one or more hybrid lasers formed with bonding layers as described herein. Any one or more of the components of the computing device 1800 may include, or be included in, an IC device 1600 (FIG. 8). Any one or more of the components of the computing device 1800 may include, or be included in, an IC device assembly 1700 (FIG. 9).

A number of components are illustrated in FIG. 10 as included in the computing device 1800, but any one or more of these components may be omitted or duplicated, as suitable for the application. In some embodiments, some or all of the components included in the computing device 1800 may be attached to one or more motherboards. In some embodiments, some or all of these components are fabricated onto a single system-on-a-chip (SoC) die.

Additionally, in various embodiments, the computing device 1800 may not include one or more of the components illustrated in FIG. 10, but the computing device 1800 may include interface circuitry for coupling to the one or more components. For example, the computing device 1800 may not include a display device 1806, but may include display device interface circuitry (e.g., a connector and driver circuitry) to which a display device 1806 may be coupled. In another set of examples, the computing device 1800 may not include an audio input device 1824 or an audio output device 1808 but may include audio input or output device interface circuitry (e.g., connectors and supporting circuitry) to which an audio input device 1824 or audio output device 1808 may be coupled.

The computing device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing device 1800 may include a memory 1804, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random-access memory (eDRAM) or spin transfer torque magnetic random-access memory (STT-M RAM).

In some embodiments, the computing device 1800 may include a communication chip 1812 (e.g., one or more communication chips). For example, the communication chip 1812 may be configured for managing wireless communications for the transfer of data to and from the computing device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The computing device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The computing device 1800 may include battery/power circuitry 1814. The battery/power circuitry 1814 may include one or more energy storage devices (e.g., batteries or capacitors) and/or circuitry for coupling components of the computing device 1800 to an energy source separate from the computing device 1800 (e.g., AC line power).

The computing device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display, for example.

The computing device 1800 may include an audio output device 1808 (or corresponding interface circuitry, as discussed above). The audio output device 1808 may include any device that generates an audible indicator, such as speakers, headsets, or earbuds, for example.

The computing device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The computing device 1800 may include a GPS device 1818 (or corresponding interface circuitry, as discussed above). The GPS device 1818 may be in communication with a satellite-based system and may receive a location of the computing device 1800, as known in the art.

The computing device 1800 may include an other output device 1810 (or corresponding interface circuitry, as discussed above). Examples of the other output device 1810 may include an audio codec, a video codec, a printer, a wired or wireless transmitter for providing information to other devices, or an additional storage device.

The computing device 1800 may include an other input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1800 may have any desired form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, the computing device 1800 may be any other electronic device that processes data.

SELECT EXAMPLES

The following paragraphs provide various examples of the embodiments disclosed herein.

Example 1 provides a hybrid laser that includes a waveguide layer including a waveguide formed of a substantially monocrystalline material; a light-emitting layer including a III-V semiconductor material; and a bonding layer between the waveguide layer and the light-emitting layer, the bonding layer including a group IV material having a lower crystallinity than the waveguide.

Example 2 provides the hybrid laser of example 1, where the bonding layer includes amorphous silicon.

Example 3 provides the hybrid laser of example 1 or 2, where the bonding layer includes amorphous germanium.

Example 4 provides the hybrid laser of any of the preceding examples, where the bonding layer has a thickness between 10 nanometers and 100 nanometers including all values and ranges therein, e.g., between 20 and 60 nanometers.

Example 5 provides the hybrid laser of any of the preceding examples, where the bonding layer has a seam running parallel to the waveguide layer and the light-emitting layer.

Example 6 provides the hybrid laser of any of the preceding examples, where the waveguide includes single-crystal silicon.

Example 7 provides the hybrid laser of any of examples 1-5, where the waveguide includes single-crystal germanium.

Example 8 provides the hybrid laser of any of the preceding examples, where the substantially monocrystalline material forming the waveguide has a grain size of at least 5 nanometers, e.g., a grain size of at least 50 nanometers or at least 100 nanometers.

Example 9 provides the hybrid laser of any of the preceding examples, further including a first electrical contact coupled to an active portion of the light-emitting layer; and a second electrical contact and a third electrical contact on either side of the active portion of the light-emitting layer.

Example 10 provides the hybrid laser of example 9, where the light-emitting layer includes an n-type semiconductor layer extending between the second electrical contact and third electrical contact, and the second electrical contact and the third electrical contact are coupled to the n-type semiconductor layer.

Example 11 provides the hybrid laser of example 9, where the second electrical contact and the third electrical contact are formed over and coupled to the waveguide layer.

Example 12 provides an IC device that includes a first layer including a waveguide formed of a substantially monocrystalline material; a second layer including a III-V semiconductor material; and a bonding layer between the first layer and the second layer, the bonding layer including a group IV material having a lower crystallinity than the first layer.

Example 13 provides the IC device of example 12, where the bonding layer includes amorphous silicon.

Example 14 provides the IC device of example 12 or 13, where the bonding layer includes amorphous germanium.

Example 15 provides the IC device of any of examples 12-14, where the bonding layer has a thickness between 10 nanometers and 100 nanometers including all values and ranges therein, e.g., between 20 and 60 nanometers.

Example 16 provides the IC device of any of examples 12-15, where the bonding layer has a seam running parallel to the first layer and the second layer.

Example 17 provides the IC device of any of examples 12-16, where the substantially monocrystalline material includes silicon.

Example 18 provides the IC device of any of examples 12-16, where the substantially monocrystalline material includes germanium.

Example 19 provides the IC device of any of examples 12-18, where the waveguide has a grain size of at least 5 nanometers, e.g., a grain size of at least 50 nanometers or at least 100 nanometers.

Example 20 provides the IC device of any of examples 12-19, further including a first electrical contact coupled to an active region of the second layer; and a second electrical contact and a third electrical contact on either side of the active region of the second layer.

Example 21 provides the IC device of example 20, where the second electrical contact and the third electrical contact are coupled to a semiconductor layer extending between the second electrical contact and third electrical contact.

Example 22 provides the IC device of example 20, where the second electrical contact and the third electrical contact are formed over and coupled to the first layer.

Example 23 provides the IC device of any of examples 12-22, where the second layer includes an active region to emit light.

Example 24 provides the IC device of example 23, where the active region includes a multiple quantum well.

Example 25 provides a method for fabricating an IC device that involves forming a first layer including a waveguide, the waveguide formed of a substantially monocrystalline material; forming a second layer including a III-V semiconductor material; and bonding the first layer and the second layer with a bonding material, the bonding material including a group IV material having a lower crystallinity than the waveguide.

Example 26 provides the method of example 25, where bonding the first layer and the second layer includes depositing a first portion of the bonding material to a first face of the first layer; depositing a second portion of the bonding material to a second face of the second layer; and contacting the first face of the first layer to the second face of the second layer.

Example 27 provides the method of example 26, where the first portion of the bonding material has a thickness between 5 nanometers and 50 nanometers, and the second portion of the bonding material has a thickness between 5 nanometers and 50 nanometers.

Example 28 provides the method of any of examples 25-27, where the bonding the first layer and the second layer is performed in a vacuum chamber.

Example 29 provides an IC package that includes an IC die, including one or more of the IC devices according to any one of the preceding examples. The IC package may also include a further component, coupled to the IC die.

Example 30 provides the IC package according to example 29, where the further component is one of a package substrate, a flexible substrate, or an interposer.

Example 31 provides the IC package according to examples 29 or 30, where the further component is coupled to the IC die via one or more first level interconnects.

Example 32 provides the IC package according to example 31, where the one or more first level interconnects include one or more solder bumps, solder posts, or bond wires.

Example 33 provides a computing device that includes a circuit board; and an IC die coupled to the circuit board, where the IC die includes one or more of the IC devices according to any one of the preceding examples (e.g., IC devices according to any one of examples 1-28), and/or the IC die is included in the IC package according to any one of the preceding examples (e.g., the IC package according to any one of examples 29-32).

Example 34 provides the computing device according to example 33, where the computing device is a wearable computing device (e.g., a smart watch) or handheld computing device (e.g., a mobile phone).

Example 35 provides the computing device according to examples 33 or 34, where the computing device is a server processor.

Example 36 provides the computing device according to examples 33 or 34, where the computing device is a motherboard.

Example 37 provides the computing device according to any one of examples 33-36, where the computing device further includes one or more communication chips and an antenna.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A hybrid laser comprising:
    a waveguide layer comprising a waveguide formed of a substantially monocrystalline material;
    a light-emitting layer comprising a III-V semiconductor material; and
    a bonding layer between the waveguide layer and the light-emitting layer, the bonding layer comprising a group IV material having a lower crystallinity than the waveguide, wherein the bonding layer comprises a seam running parallel to the waveguide layer and the light-emitting layer.

2. The hybrid laser of claim 1, wherein the bonding layer comprises amorphous silicon.

3. The hybrid laser of claim 1, wherein the bonding layer comprises amorphous germanium.

4. The hybrid laser of claim 1, wherein the bonding layer has a thickness between 10 nanometers and 100 nanometers.

5. The hybrid laser of claim 1, further comprising:
    a first electrical contact coupled to an active portion of the light-emitting layer; and a second electrical contact and a third electrical contact on either side of the active portion of the light-emitting layer.

6. The hybrid laser of claim 5, wherein the second electrical contact and the third electrical contact are formed over and coupled to the waveguide layer.

7. An integrated circuit (IC) device comprising:
a first layer comprising a waveguide formed of a substantially monocrystalline material;
a second layer comprising a III-V semiconductor material; and
a bonding layer between the first layer and the second layer, the bonding layer comprising a group IV material having a lower crystallinity than the first layer, wherein the bonding layer has a seam running parallel to the first layer and the second layer.

8. The IC device of claim 7, wherein the bonding layer comprises amorphous silicon.

9. The IC device of claim 7, wherein the bonding layer comprises amorphous germanium.

10. The IC device of claim 7, wherein the bonding layer has a thickness between 10 nanometers and 100 nanometers.

11. The IC device of claim 7, wherein the substantially monocrystalline material comprises silicon.

12. The IC device of claim 7, wherein the substantially monocrystalline material comprises germanium.

13. The IC device of claim 7, wherein the waveguide has a grain size of at least 5 nanometers.

14. The IC device of claim 7, further comprising:
a first electrical contact coupled to an active region of the second layer; and
a second electrical contact and a third electrical contact on either side of the active region of the second layer.

15. The IC device of claim 14, wherein the second electrical contact and the third electrical contact are coupled to a semiconductor layer extending between the second electrical contact and the third electrical contact.

16. The IC device of claim 14, wherein the second electrical contact and the third electrical contact are formed over and coupled to the first layer.

17. A method for fabricating an integrated circuit (IC) device comprising:
forming a first layer comprising a waveguide, the waveguide formed of a substantially monocrystalline material;
forming a second layer comprising a III-V semiconductor material; and
bonding the first layer and the second layer with a bonding material, the bonding material comprising a group IV material having a lower crystallinity than the waveguide, wherein the bonding material comprises a seam running parallel to the first layer and the second layer.

18. The method of claim 17, wherein bonding the first layer and the second layer comprises:
depositing a first portion of the bonding material to a first face of the first layer;
depositing a second portion of the bonding material to a second face of the second layer; and
contacting the first face of the first layer to the second face of the second layer.

19. The hybrid laser of claim 1, wherein the bonding layer comprises different materials on either side of the seam.

20. The hybrid laser of claim 1, wherein the bonding layer comprises a same bonding material on either side of the seam.

* * * * *